(12) United States Patent
Wang et al.

(10) Patent No.: US 9,880,661 B2
(45) Date of Patent: Jan. 30, 2018

(54) TOUCH CONTROL DRIVING METHOD, TOUCH CONTROL DRIVING APPARATUS AND TOUCH CONTROL DISPLAY DEVICE

(71) Applicants: BOE Technology Group Co., Ltd., Beijing (CN); Beijing BOE Optoelectronics Technology Co., Ltd., Beijing (CN)

(72) Inventors: Xiurong Wang, Beijing (CN); Lingyun Shi, Beijing (CN); Hao Zhang, Beijing (CN); Bo Gao, Beijing (CN); Yafei Li, Beijing (CN); Peng Han, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/307,127

(22) PCT Filed: Dec. 29, 2015

(86) PCT No.: PCT/CN2015/099459
§ 371 (c)(1),
(2) Date: Oct. 27, 2016

(87) PCT Pub. No.: WO2017/024738
PCT Pub. Date: Feb. 16, 2017

(65) Prior Publication Data
US 2017/0185213 A1    Jun. 29, 2017

(30) Foreign Application Priority Data
Aug. 7, 2015 (CN) .......................... 2015 1 0484944

(51) Int. Cl.
*G06F 3/041* (2006.01)
*G06F 1/32* (2006.01)
*G06F 3/044* (2006.01)

(52) U.S. Cl.
CPC .......... *G06F 3/0416* (2013.01); *G06F 1/3262* (2013.01); *G06F 3/044* (2013.01)

(58) Field of Classification Search
CPC combination set(s) only.
See application file for complete search history.

(56) References Cited

U.S. PATENT DOCUMENTS

2012/0169667 A1* 7/2012 Lu .......................... G06F 1/3262
                                                        345/175
2013/0293484 A1   11/2013 Singh et al.
(Continued)

FOREIGN PATENT DOCUMENTS

CN   101702106 A   5/2010
CN   103019796 A   4/2013
(Continued)

OTHER PUBLICATIONS

International Search Report and Written Opinion, including English translation of Written Opinion, for International Application No. PCT/CN2015/099459, dated Apr. 27, 2016, 11 pages.

*Primary Examiner* — Robin Mishler
(74) *Attorney, Agent, or Firm* — Westman, Champlin & Koehler, P.A.

(57) ABSTRACT

The embodiments of the present disclosure provide a touch control driving method, a touch control driving apparatus and a touch control display device, capable of reducing power consumption of a touch screen. The method comprises: inputting a touch control driving signal at a first scan frequency for touch control scan; detecting a writing frequency of a Random Access Memory (RAM) and a duration for the writing frequency; and reducing the first scan frequency to a second scan frequency when the writing frequency of the RAM is larger than or equal to a first threshold and the duration for the writing frequency is larger than or equal to a second threshold. The method can be applied in a process of touch control driving.

17 Claims, 3 Drawing Sheets

(56) References Cited

U.S. PATENT DOCUMENTS

| | | | |
|---|---|---|---|
| 2014/0049480 A1* | 2/2014 | Rabii | G06F 3/041 345/173 |
| 2014/0104208 A1* | 4/2014 | Lee | G06F 3/0416 345/173 |
| 2014/0176450 A1* | 6/2014 | Chang | G09G 5/00 345/173 |
| 2014/0267157 A1* | 9/2014 | Dorfner | G06F 3/044 345/174 |
| 2016/0246431 A1 | 8/2016 | Ma et al. | |
| 2016/0259467 A1* | 9/2016 | Nayyar | G06F 1/3262 |

FOREIGN PATENT DOCUMENTS

| | | |
|---|---|---|
| CN | 103034347 A | 4/2013 |
| CN | 202887141 U | 4/2013 |
| CN | 103235664 A | 8/2013 |
| CN | 103294158 A | 9/2013 |
| CN | 103558941 A | 2/2014 |
| CN | 103577096 A | 2/2014 |
| CN | 103885567 A | 6/2014 |
| CN | 104063105 A | 9/2014 |
| CN | 104991682 A | 10/2015 |

* cited by examiner

TOUCH CONTROL DRIVING METHOD, TOUCH CONTROL DRIVING APPARATUS AND TOUCH CONTROL DISPLAY DEVICE

The present application is a Section 371 National Stage Application of International Application No. PCT/CN2015/099459, filed on 29 Dec. 2015, which claims priority to Chinese patent application No. 201510484944.5, entitled "TOUCH CONTROL DRIVING METHOD, TOUCH CONTROL DRIVING APPARATUS AND TOUCH CONTROL DISPLAY DEVICE", filed on Aug. 7, 2015, which are incorporated here by reference in their entirety.

TECHNICAL FIELD

The present disclosure relates to touch control technology, and more particularly, to a touch control driving method, a touch control driving apparatus and a touch control display device.

BACKGROUND

There are two types of touch screens: self-capacitance screens and mutual-capacitance screens. Conventionally, the self-capacitance screen adopts a scan driving scheme known as time-division driving scheme. Of course, a mutual-capacitance screen may also adopt the time-division driving scheme for scan driving. However the overall power consumption of the touch control module is also increased, especially when the user does not need to use the touch control function frequently, which may cause a waste of power consumption.

SUMMARY

It is an object of the present disclosure to provide a touch control driving method, a touch control driving apparatus and a touch control display device, capable of reducing power consumption of a touch screen.

In order to achieve the above object, the following solutions are provided according to the embodiment of the present disclosure.

In an aspect, a touch control driving method is provided according to an embodiment of the present disclosure. The method comprises: inputting a touch control driving signal at a first scan frequency for touch control scan; detecting a writing frequency of a Random Access Memory (RAM) and a duration for the writing frequency; and reducing the first scan frequency to a second scan frequency when the writing frequency of the RAM is larger than or equal to a first threshold and the duration for the writing frequency is larger than or equal to a second threshold.

Further, the first scan frequency is N times the second scan frequency, where N is an integer larger than 1.

Further, the first threshold has a value ranging from 25 frames per second to 30 frames per second.

Further, the second threshold is 5 seconds.

Further, the step of detecting the writing frequency of the RAM and the duration for the writing frequency comprises: detecting the writing frequency of the RAM; and recording the duration for the writing frequency when the writing frequency of the RAM is larger than or equal to the first threshold.

Further, the method further comprises, subsequent to said reducing the first scan frequency to the second scan frequency: restoring the second scan frequency to the first scan frequency upon detection of a touch action triggered by a user.

In another aspect, a touch control driving apparatus is provided according to an embodiment of the present disclosure. The apparatus comprises: a scan unit configured to input a touch control driving signal at a first scan frequency for touch control scan; a detection unit configured to detect a writing frequency of a Random Access Memory (RAM) and a duration for the writing frequency; and a frequency conversion unit configured to reduce the first scan frequency to a second scan frequency when the writing frequency of the RAM is larger than or equal to a first threshold and the duration for the writing frequency is larger than or equal to a second threshold.

Further, the apparatus further comprises a memory unit. The detection unit is further configured to detect the writing frequency of the RAM and store it in the memory unit and record the duration for the writing frequency in the memory unit when the writing frequency of the RAM is larger than or equal to the first threshold.

Further, the frequency conversion unit is further configured to restore the second scan frequency to the first scan frequency upon detection of a touch action triggered by a user.

Further, the touch control driving apparatus is a driver Integrated Circuit (IC).

In yet a further aspect, a touch control display device is provided according to an embodiment of the present disclosure. The touch control display device comprises the above touch control driving apparatus.

BRIEF DESCRIPTION OF THE DRAWINGS

In order to illustrate the solutions according to the embodiments of the present disclosure or the conventional solutions more clearly, the figures used for description of the embodiments or conventional solutions will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

In the following, for the purpose of illustration, rather than limitation, details such as specific system structures, interfaces and techniques are described to facilitate thorough understanding of the present disclosure. However, it can be appreciated by those skilled in the art that, in other embodiments, the present disclosure can be implemented without these details. In other cases, details of well-known devices, circuits and methods will be omitted, so as not to obscure the description of the present disclosure.

Further, the terms "first" and "second" are used for illustration only, but do not indicate or imply any relative importance or imply an amount of the technical features as indicated. Hence, the feature with limitation of "first" or "second" includes, explicitly or implicitly, one or more such features. In the description of the present disclosure, "a plurality of" means "two or more", unless indicated otherwise.

Figure 1:
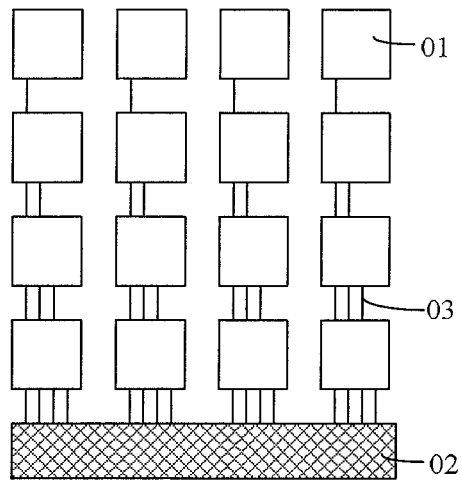
FIG. 1 is a schematic diagram showing a structure of a conventional self-capacitance screen.

A self-capacitance screen, for example, as shown in FIG. 1, has a horizontal and vertical array of electrodes 01 formed by a transparent conductive material (such as Indium Tin Oxide (ITO)) on a glass surface. A scan line 03 is connected between each electrode 01 and a driver IC 02. A so-called self-capacitance is formed between the respective electrode 01 and the ground, i.e., an electrode-to-ground capacitance. When a user's finger touches the self-capacitance screen, the capacitance of the finger increases the capacitance value of the screen body. In this case, the driver IC 02 can determine lateral and longitudinal coordinates of the touch position based on the change in the capacitance before and after the touch.

Figure 2:
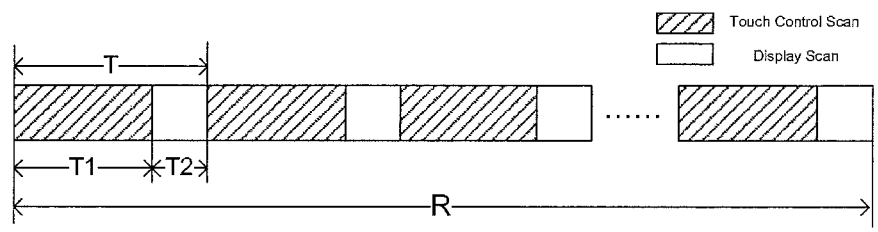
FIG. 2 is a schematic diagram showing a principle of a conventional time-division driving scheme.
Figure 3:
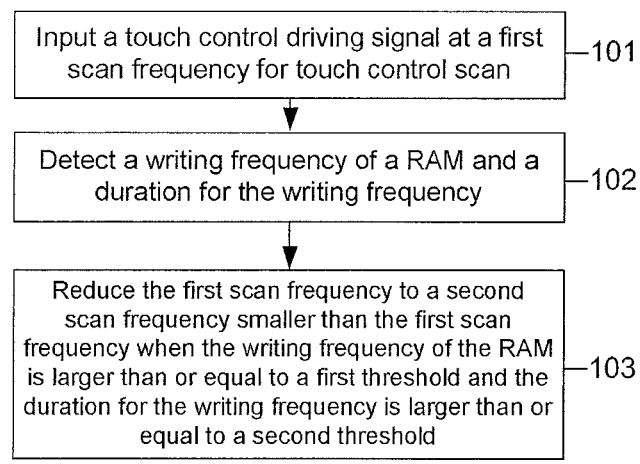
FIG. 3 is a flowchart illustrating a touch control driving method according to an embodiment of the present disclosure.

As shown in FIG. 2, in a display cycle, R, for example, the time-division driving scheme can divide unit time, T, into two portions: one (T1) for touch control scan and the other (T2) for display scan. In this way, the touch control scan and the display scan do not interfere with each other, thereby allowing high-frequency touch control scan and improving accuracy of touch control detection. However, at the same time the overall power consumption of the touch control module is also increased, especially when the user does not need to use the touch control function frequently, which may cause a waste of power consumption According to an embodiment of the present disclosure, a touch control driving method is provided. As shown in FIG. 3, the method includes the following steps. At 101, a touch control driving signal is inputted at a first scan frequency for touch control scan. At 102, a writing frequency of a Random Access Memory (RAM) and a duration for the writing frequency are detected. At 103, the first scan frequency is reduced to a second scan frequency when the writing frequency of the RAM is larger than or equal to a first threshold and the duration for the writing frequency is larger than or equal to a second threshold. The second scan frequency is smaller than the first scan frequency.

At step 101, a touch control driving apparatus inputs a touch control driving signal at a first scan frequency to a touch control electrode for touch control scan.

Figure 4:
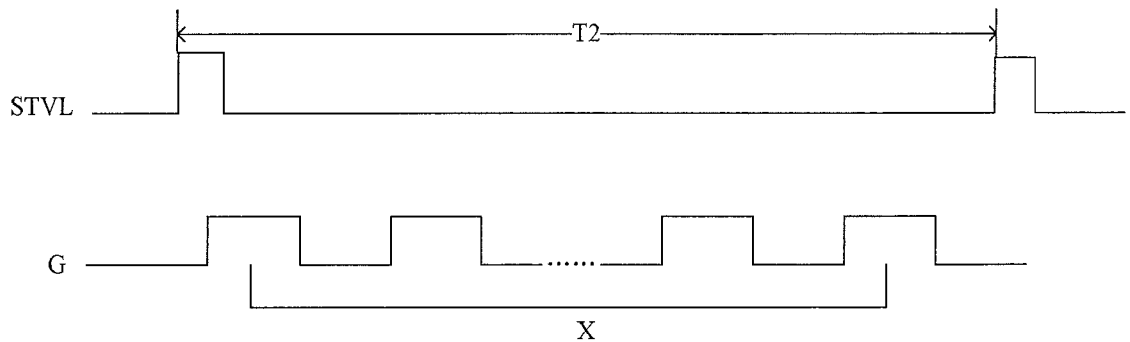
FIG. 4 is a timing sequence diagram of a touch control scan signal according to an embodiment of the present disclosure.

In particular, in the time division driving scheme, as shown in FIG. 2, in a display cycle, R, for example, unit time, T, can be divided into two portions: one (T1) for display scan and the other (T2) for touch control scan. During each time T2 for touch control scan, in the timing sequence diagram as shown in FIG. 4 for example, STVL denotes a system clock and G denotes the ouch control scan signal. The touch control driving apparatus can divide the touch control signal within T2 into a number, X, of partitions, depending on the arrangement of the electrodes within the touch control panel. In this case, when the number of partitions is X, the touch control scan frequency is the first scan frequency.

It can be seen from FIG. 2 that the first scan frequency for touch control scan is the same as the display scan frequency for display scan. Alternatively, the first scan frequency can be a multiple of the display scan frequency. That is, one or more touch control scans can be performed each time a display scan is performed. In this way, it is possible to improve the accuracy of the touch control detection. However, at the same time the overall power consumption of the touch control display device is also increased, especially when the user does not need to use the touch control function frequently (e.g., when the user is watching a video and thus only needs the display function but hardly the touch control function), which may cause a waste of power consumption.

Hence, in the step 102, the touch control driving apparatus detects a writing frequency of its Random Access Memory (RAM) and a duration for the writing frequency.

Here, the touch control driving apparatus may have a Random Access Memory (RAM), which can be read and write at any time at a high speed and thus typically serve as a temporary data storage medium for currently running programs.

In particular, the touch control driving apparatus can first detect the writing frequency of the RAM. When the writing frequency of the RAM is larger than or equal to the first threshold, the touch control driving apparatus records the duration for the writing frequency. In this way, the touch control driving apparatus can determine whether the user currently needs to use the touch control function frequently based on the writing frequency of the RAM and the duration for the writing frequency.

Further, in the step 103, it is assumed that the first threshold is 30 frames per second and the playback speed of the video is typically 30 frames per second. Hence, when the writing frequency of the RAM is larger than or equal to the first threshold and the duration for the writing frequency is larger than or equal to the second threshold, i.e., when the writing frequency of the RAM is larger than 30 frames per second continuously, it can be determined that the user is currently watching a video and does not need to use the touch control function frequently. In this case, the touch control driving apparatus can reduce the first scan frequency to the second scan frequency smaller than the first scan frequency.

In particular, again in the timing sequence diagram as shown in FIG. 4 for example, when the writing frequency of the RAM is larger than or equal to the first threshold and the duration for the writing frequency is larger than or equal to the second threshold, the touch control driving apparatus can reduce the number of partitions within each display cycle R. For example, the number of partitions within each time T2 for touch control scan can be reduced to X/2. In this case, the frequency of touch control scan is the second scan frequency. Since the number of partitions within T2 has been reduced by half, the first scan frequency is twice the second scan frequency.

In this way, it is possible to reduce waste of power consumption due to unnecessary touch control scans while ensuring providing the display function to the user, thereby reducing the overall power consumption of the touch control display device.

The embodiment of the present disclosure provides a touch control driving method. When the touch control driving apparatus inputs a touch control driving signal at a first scan frequency for touch control scan, a writing frequency of its RAM and a duration for the writing frequency are detected. When the writing frequency of the RAM is larger than or equal to a first threshold and the duration for the writing frequency is larger than or equal to a second threshold, it is determined that currently the user does not need to use the touch control function frequently, e.g., when the user is currently watching a video. In this case, the touch control driving apparatus can reduce the first scan frequency to a second scan frequency. In this way, while ensuring that the user does not need to use the touch control function frequently, the frequency of the touch control scan and thus the power consumption of the touch control display device can be reduced, so as to avoid waste of resources.

Figure 5:
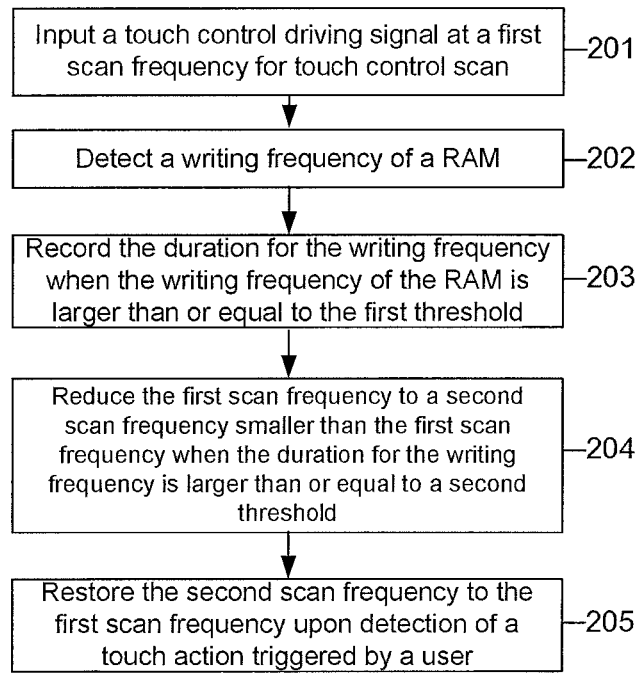
FIG. 5 is a flowchart illustrating a touch control driving method according to another embodiment of the present disclosure.

According to another embodiment of the present disclosure, a touch control driving method is provided. As shown in FIG. 5, the touch control driving method includes the following steps. At 201, a touch control driving signal is inputted at a first scan frequency for touch control scan. At 202, a writing frequency of a Random Access Memory (RAM) is detected. At 203, the duration for the writing frequency is recorded when the writing frequency of the RAM is larger than or equal to the first threshold. At 204, the first scan frequency is reduced to a second scan frequency smaller than the first scan frequency when the writing frequency of the RAM is larger than or equal to a first threshold and the duration for the writing frequency is larger than or equal to a second threshold. At 205, the second scan frequency is restored to the first scan frequency upon detection of a touch action triggered by a user.

At step 201, a touch control driving apparatus inputs a touch control driving signal at a first scan frequency to a touch control electrode for touch control scan.

In particular, in the time division driving scheme, as shown in FIG. 2, in a display cycle, R, for example, unit time, T, can be divided into two portions: one (T1) for display scan and the other (T2) for touch control scan. During each time T2 for touch control scan, again in the timing sequence diagram as shown in FIG. 4 for example, the touch control signal within T2 can be divided into a number, X, of partitions, depending on the arrangement of the electrodes within the touch control panel. In this case, when the number of partitions is X, the touch control scan frequency is the first scan frequency.

Further, after the touch control driving signal is inputted at the first scan frequency for touch control scan, at step 202, the touch control driving apparatus detects a writing frequency of a RAM. If the writing frequency of the RAM is larger than the first threshold, the method proceeds with step 203.

Optionally, the first threshold can be 30 frames per second.

Of course, there can be various situations for the value of the first threshold. For example, since human eyes have a recognition limit of 25 frames per second, the first threshold can be set to 25 frames per second. The present disclosure is not limited to any value of the first threshold.

In particular, in the step S203, if the writing frequency of the RAM is larger than the first threshold, the touch control driving apparatus records the duration for the writing frequency and store it in a memory unit. If the duration for the writing frequency is larger than or equal to the second threshold, the method proceeds with step 204.

Here, the second threshold can be 5 seconds.

Of course, there can be various situations for the value of the second threshold. The present disclosure is not limited to any value of the second threshold. For example, the user can set the value of the second threshold manually in the touch control driving apparatus.

At step 204, if the duration for the writing frequency is larger than or equal to the second threshold, the touch control driving apparatus reduces the first scan frequency to a second scan frequency smaller than the first scan frequency.

Here, in the step 201, the first scan frequency can be N times the second scan frequency, where N is an integer larger than 1.

Figure 6:
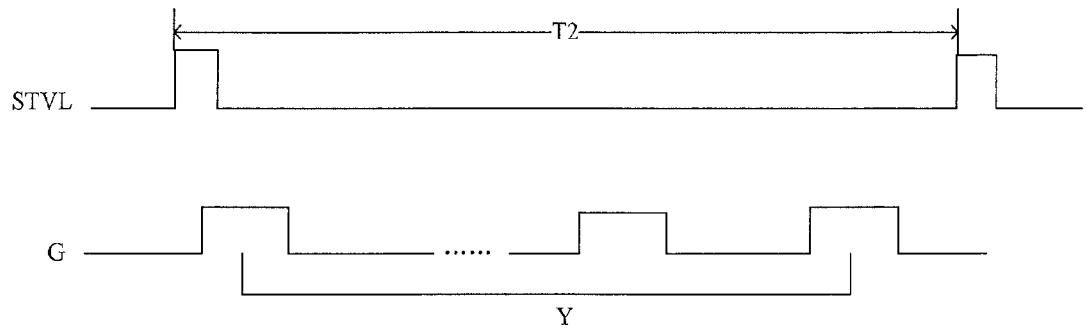
FIG. 6 is a timing sequence diagram of a touch control scan signal according to another embodiment of the present disclosure.

In particular, when the writing frequency of the RAM is larger than or equal to the first threshold and the duration for the writing frequency is larger than or equal to the second threshold, it can be determined that the user is currently watching a video and does not need to use the touch control function frequently. In this case, as shown in FIG. 6 which is a timing sequence diagram after frequency conversion, the touch control driving apparatus can reduce the number of partitions in each time T2 for touch control scan to Y (X>Y). Accordingly, the touch control scan frequency is the second scan frequency.

For example, the number of partitions can be reduced to X/3 (i.e., 3Y=X). In this case, the second scan frequency for touch control scan within the time T2 is reduced to ⅓ of the original first scan frequency. Accordingly, the first scan frequency is 3 times the second scan frequency.

In this way, it is possible to reduce waste of power consumption due to unnecessary touch control scans while ensuring providing the display function to the user, thereby reducing the overall power consumption of the touch control display device.

Furthermore, after the first scan frequency has been reduced to the second scan frequency, while the second scan frequency for touch control scan is lower, a touch action triggered by the user can still be detected. Once a touch action triggered by the user is detected, it can be determined that the user wants to restore the original touch control function. In this case, at step 205, the touch control driving apparatus can restore the second scan frequency to the first scan frequency, thereby satisfying the user's requirement on the sensitivity of touch control detection.

As above, the embodiment of the present disclosure provides a touch control driving method. When the touch control driving apparatus inputs a touch control driving signal at a first scan frequency for touch control scan, a writing frequency of its RAM and a duration for the writing frequency are detected. When the writing frequency of the RAM is larger than or equal to a first threshold and the duration for the writing frequency is larger than or equal to a second threshold, it is determined that currently the user does not need to use the touch control function frequently, e.g., when the user is currently watching a video. In this case, the touch control driving apparatus can reduce the first scan frequency to a second scan frequency. In this way, while ensuring that the user does not need to use the touch control function frequently, the frequency of the touch control scan and thus the power consumption of the touch control display device can be reduced, so as to avoid waste of resources.

Figure 7:
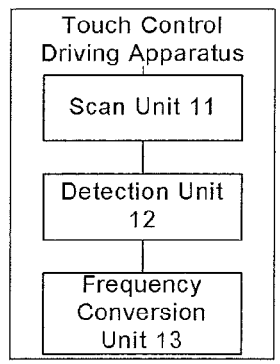
FIG. 7 is a schematic diagram showing a structure of a touch control driving apparatus according to another embodiment of the present disclosure.

According to an embodiment of the present disclosure, a touch control driving apparatus is provided. As shown in FIG. 7, the apparatus includes: a scan unit 11 configured to input a touch control driving signal at a first scan frequency for touch control scan; a detection unit 12 configured to detect a writing frequency of a Random Access Memory (RAM) and a duration for the writing frequency; and a frequency conversion unit 13 configured to reduce the first scan frequency to a second scan frequency when the writing frequency of the RAM is larger than or equal to a first threshold and the duration for the writing frequency is larger than or equal to a second threshold.

Optionally, the first scan frequency is N times the second scan frequency, where N is an integer larger than 1.

Optionally, the first threshold has a value ranging from 25 frames per second to 30 frames per second.

Optionally, the second threshold is 5 seconds.

Figure 8:
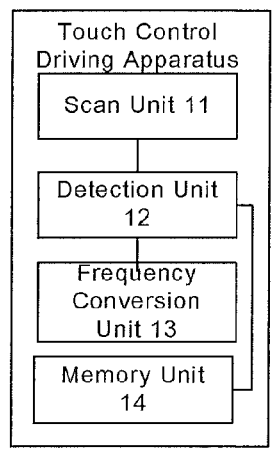
FIG. 8 is a schematic diagram showing a structure of a touch control driving apparatus according to yet another embodiment of the present disclosure.

As shown in FIG. 8, the apparatus further includes a memory unit 14. In particular, the detection unit 12 is configured to detect the writing frequency of the RAM and store it in the memory unit 14, and to record the duration for the writing frequency in the memory unit 14 when the writing frequency of the RAM is larger than or equal to the first threshold.

The frequency conversion unit 13 is further configured to restore the second scan frequency to the first scan frequency upon detection of a touch action triggered by a user.

In particular, the touch control driving apparatus can be e.g., a driver Integrated Circuit (IC).

According to an embodiment of the present disclosure, a touch control display device is provided. The touch control display device includes any of the above touch control driving apparatuses.

Here, the touch control display device can be a liquid crystal panel, e-paper, an OLED panel, a mobile phone, a tablet computer, a television, a display, a notebook computer, a digital frame, a navigator, or any other product or component having display functions.

The embodiments of the present disclosure provide a touch control driving apparatus and a touch control display device. When the touch control driving apparatus inputs a touch control driving signal at a first scan frequency for touch control scan, a writing frequency of its RAM and a duration for the writing frequency are detected. When the writing frequency of the RAM is larger than or equal to a first threshold and the duration for the writing frequency is larger than or equal to a second threshold, it is determined that currently the user does not need to use the touch control function frequently, e.g., when the user is currently watching a video. In this case, the touch control driving apparatus can reduce the first scan frequency to a second scan frequency. In this way, while ensuring that the user does not need to use the touch control function frequently, the frequency of the touch control scan and thus the power consumption of the touch control display device can be reduced, so as to avoid waste of resources.

The specific features, structures, materials or characteristics as described in the present disclosure can be combined as appropriate in any of one or more embodiments or examples.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

What is claimed is:

1. A touch control driving method, comprising:
    inputting a touch control driving signal at a first scan frequency for touch control scan;
    detecting a writing frequency of a Random Access Memory (RAM) and a duration for the writing frequency; and
    reducing the first scan frequency to a second scan frequency when the writing frequency of the RAM is larger than or equal to a first threshold and the duration for the writing frequency is larger than or equal to a second threshold.

2. The method of claim 1, wherein the first scan frequency is N times the second scan frequency, where N is an integer larger than 1.

3. The method of claim 1, wherein the first threshold has a value ranging from 25 frames per second to 30 frames per second.

4. The method of claim 1, wherein the second threshold is 5 seconds.

5. The method of claim 1, wherein said detecting the writing frequency of the RAM and the duration for the writing frequency comprises:
    detecting the writing frequency of the RAM; and
    recording the duration for the writing frequency when the writing frequency of the RAM is larger than or equal to the first threshold.

6. The method of any of claim 1, further comprising, subsequent to said reducing the first scan frequency to the second scan frequency:
    restoring the second scan frequency to the first scan frequency upon detection of a touch action triggered by a user.

7. A touch control driving apparatus, comprising:
    a scan unit configured to input a touch control driving signal at a first scan frequency for touch control scan;
    a detection unit configured to detect a writing frequency of a Random Access Memory (RAM) and a duration for the writing frequency; and
    a frequency conversion unit configured to reduce the first scan frequency to a second scan frequency when the writing frequency of the RAM is larger than or equal to a first threshold and the duration for the writing frequency is larger than or equal to a second threshold.

8. The apparatus of claim 7, further comprising a memory unit, wherein
    the detection unit is further configured to detect the writing frequency of the RAM and store it in the memory unit and record the duration for the writing frequency in the memory unit when the writing frequency of the RAM is larger than or equal to the first threshold.

9. The apparatus of claim 7, wherein the frequency conversion unit is further configured to restore the second scan frequency to the first scan frequency upon detection of a touch action triggered by a user.

10. The apparatus of claim 7, wherein the touch control driving apparatus is a driver Integrated Circuit (IC).

11. A touch control display device, comprising the touch control driving apparatus according to claim 7.

12. The method of claim 2, further comprising, subsequent to said reducing the first scan frequency to the second scan frequency:
    restoring the second scan frequency to the first scan frequency upon detection of a touch action triggered by a user.

13. The method of claim 3, further comprising, subsequent to said reducing the first scan frequency to the second scan frequency:
    restoring the second scan frequency to the first scan frequency upon detection of a touch action triggered by a user.

14. The method of claim 4, further comprising, subsequent to said reducing the first scan frequency to the second scan frequency:

restoring the second scan frequency to the first scan frequency upon detection of a touch action triggered by a user.

15. A touch control display device, comprising the touch control driving apparatus according to claim 8.

16. A touch control display device, comprising the touch control driving apparatus according to claim 9.

17. A touch control display device, comprising the touch control driving apparatus according to claim 10.

\* \* \* \* \*